United States Patent [19]

Suter et al.

[11] Patent Number: 4,458,182
[45] Date of Patent: Jul. 3, 1984

[54] DRIVE DEVICE WITH TWO MUTUALLY COUNTERACTING MOTORS FOR ELIMINATING GEARING BACKLASH

[75] Inventors: Hans-Jörg Suter, Winkel; Jürg Wild, Bülach, both of Switzerland

[73] Assignee: Contraves AG, Zurich, Switzerland

[21] Appl. No.: 399,239

[22] Filed: Jul. 19, 1982

[30] Foreign Application Priority Data

Aug. 14, 1981 [CH] Switzerland ............... 5251/81

[51] Int. Cl.³ ............................................. G05B 11/32
[52] U.S. Cl. ...................................... 318/113; 318/625
[58] Field of Search .................... 318/5, 76, 79, 7, 113, 318/40, 41, 625

[56] References Cited

U.S. PATENT DOCUMENTS

| 876,924 | 1/1908 | Alexanderson | 318/113 |
| 885,128 | 4/1908 | Alexanderson | 318/113 |
| 1,286,130 | 11/1918 | Simmon | 318/113 |
| 3,590,349 | 5/1969 | Safinddin | 318/113 |
| 4,325,015 | 4/1982 | Heiberger | 318/625 |
| 4,354,144 | 10/1982 | McCarthy | 318/76 |

Primary Examiner—Stanley J. Witkowski
Assistant Examiner—Arthur G. Evans
Attorney, Agent, or Firm—Werner W. Kleeman

[57] ABSTRACT

With small drive torque the motors counteract one another, with full-load output they act in the same sense upon the load, so that the backlash or play between the drive, the gearing and the load is eliminated. As the motors there are used compound motors whose armatures and shunt windings are connected in series. The series excitation currents are controlled by means of two 2-quadrant power adjustment or setting elements and the external excitation current is controlled by a 2-quadrant adjustment or setting element of small output.

1 Claim, 3 Drawing Figures

4,458,182

DRIVE DEVICE WITH TWO MUTUALLY COUNTERACTING MOTORS FOR ELIMINATING GEARING BACKLASH

BACKGROUND OF THE INVENTION

The present invention relates to a new and improved 4-quadrant drive device of high precision.

Generally speaking, the 4-quadrant drive device of high precision of the present invention contains two motors which act by means of a respective gearing upon a load movable about an axis in both rotational directions, and the excitation currents of which are controlled by adjustment or setting elements. The motors operate at least partially in counteracting fashion with small summation drive torques in order to eliminate the gearing backlash or play, however these motors act in the same direction in the presence of large summation drive torques.

In drive systems the backlash or play between the motor and the load leads to instabilities and inaccuracies if disturbances act upon the load. Therefore, for high precision drives measures must be undertaken in order to eliminate the aforementioned backlash or play.

Thus, in German Pat. No. 1,290,232, published Mar. 6, 1969, there has been disclosed a drive device containing two direct-current shunt motors which counteract one another with the same torque at standstill. During an accceleration in the rotational direction of the one motor the armature current of this motor is increased and at the same time there is attenuated the field of the other motor. With a drive device of this type only one of the two motors can be effectively employed during acceleration, whereas the other motor acts in the opposite sense for exerting a counteracting effect. The small drive output and the energy losses constitute appreciable drawbacks of a drive device of this type.

Furthermore, there is known to the art a drive system containing two parallely connected electric motors having double-series excitation and external excitation. Such electric motors are provided with two circular current-free 4-quadrant power adjustment elements possessing individual current regulation, an adjustment element with current regulation for the external excitation as well as an analog electronic control for the realisation of the desired current-torque characteristic. Such type of drive system enables both of the motors to act in the same direction with large summation drive torques. In this way there can be improved the drive output, however there is required a considerable expenditure in power electronic means, which is particularly necessitated due to the installation of two complete 4-quadrant power adjustment elements.

SUMMARY OF THE INVENTION

Therefore, with foregoing in mind it is a primary object of the present invention to provide a new and improved drive device containing two mutually counteracting motors for eliminating the backlash or play existing between the motor, the gearing and the load in a manner not associated with the aforementioned drawbacks and limitations of the prior art.

Another and more specific object of the present invention aims at the provision of a new and improved drive device of the previously mentioned type, the power electronics of which can be designed to be appreciably more economical in relation to the state-of-the-art systems, and possesses a smaller volume and lower weight.

A further significant object of the present invention is directed to a new and improved construction of drive device containing two mutually counteracting motors for eliminating the backlash or play existing between the motor, the gearing and the load, which drive device is relatively simple in construction and design, quite economical to manufacture, extremely reliable in operation, and not readily subject to breakdown or malfunction.

Now in order to implement these and still further objects of the invention, which will become more readily apparent as the description proceeds, the drive device of the present development is manifested by the features that there are provided compound motors, the armatures of which as well as their shunt windings are connected in series. The series excitation currents are controlled by means of two 2-quadrant power adjustment or setting elements and the external excitation current is controlled by a 2-quadrant adjustment or setting element of small output.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
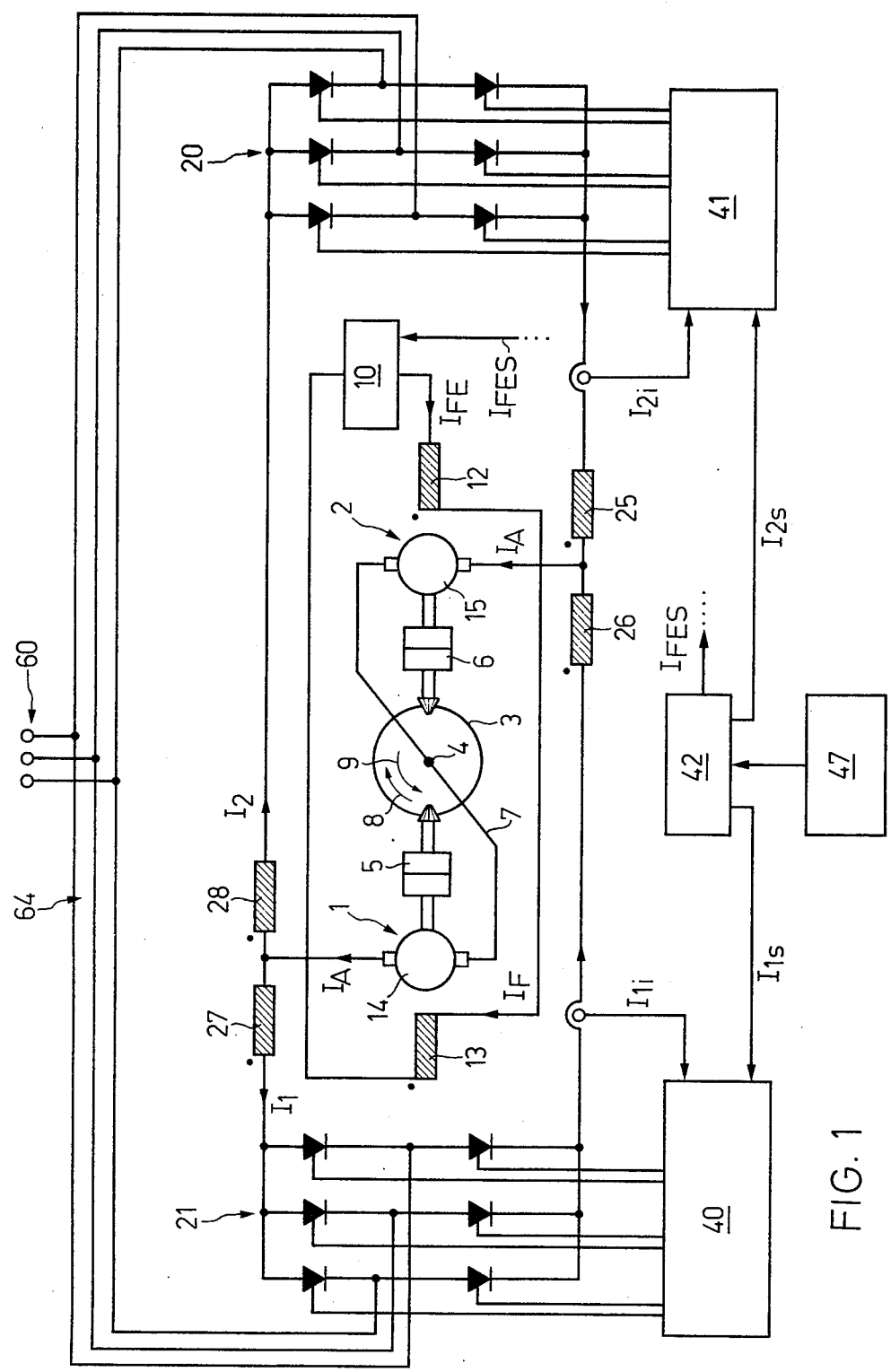
FIG. 1 is a schematic illustration of a drive device constructed according to the invention.

Describing now the drawings, as shown in FIG. 1 a load 3 is rotatable in both directions of rotation 8 and 9 about an axis or shaft 4, which also may be an imaginary axis, with the aid of both of the drive motors 1 and 2. These drive motors 1 and 2 act by means of a respective gearing 5 and 6 upon the load 3. The drive motors 1 and 2 are compound motors. Each of these compound motors 1 and 2 possesses a respective armature 14 and 15 which are electrically connected by means of a line or conductor 7, a respective shunt winding 12 and 13, and two respective series-wound windings 25, 26 and 27, 28. The winding sense of the windings has been indicated by dots located thereadjacent.

The external exitation current $I_{FE}$ flowing through the shunt windings 12 and 13 is controlled by the 2-quadrant power adjustment or setting device 10. The series-wound windings 25, 26, 27, 28 which are connected in series as well as the likewise series connected armatures 14 and 15 are powered by means of two 2-quadrant-SCR-three-phase current bridge circuits 20 and 21 constituting 2-quadrant power adjustment or setting elements. The series excitation currents $I_1$ and $I_2$ are regulated by conventional current regulators 40 and 41, respectively, to which there are inputted the actual current values $I_{1i}$ and $I_{2i}$ obtained from the series excitation current circuit and the current set values $I_{1s}$ and $I_{2s}$ from an electronic control 42 for the purpose of obtaining the desired current-torque characteristics. Equally, there is inputted to the 2-quadrant power adjustment or setting device 10 a current set value $I_{FES}$ obtained from the electronic control 42.

The electrical supply of the drive device is accomplished by means of a three-phase power infeed line 64 containing the power network connection 60. The output voltage of the three-phase current bridge circuits which is twice as high, in comparison to the parallely connected compound motors 1 and 2, is obtained by doubling the primary network voltage. Notwithstanding the increase in the output voltage the weight and the volume of the power adjustment device is not increased because there are used SCR's (silicon-controlled rectifiers) with high blocking voltage, and also there must not be tolerated any greater energy losses due to the voltage increase.

Figure 2:
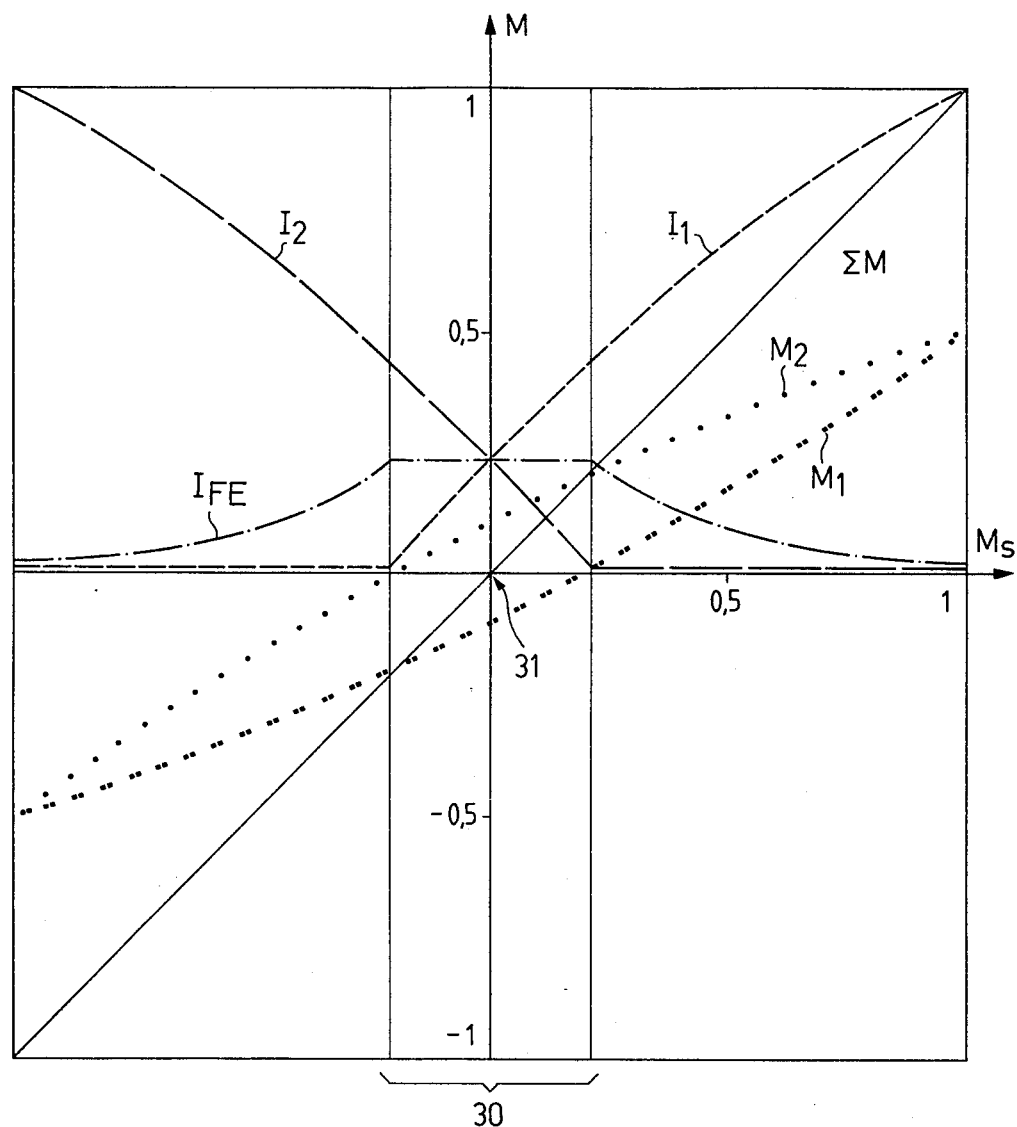
FIG. 2 is a diagram illustrating the current and torque characteristics with external excitation.

In FIG. 2 there have been illustrated the current and torque characteristics. The summation drive torque set value $M_s$ is plotted along the abscissa, and along the ordinate there has been plotted the summation drive torque actual value M, the torque $M_1$ of the first drive motor 1, the torque $M_2$ of the second drive motor 2, the external exeitation current $I_{FE}$ as well as the series exitation currents $I_1$ and $I_2$. FIG. 2 clearly shows the manner in which the drive motors 1 and 2 can be caused to counteract one another within a relatively narrow, preselected counteracting or clamping range 30 which is at the region of the null value 31 of the summation drive torque set value $M_s$. With higher summation drive torque set values in both directions the drive motors 1 and 2 do not counteract one another, something which also is not necessary since in these ranges there does not arise any gearing backlash or play. Equally, in the illustration of FIG. 2 there has been shown that both drive motors 1 and 2 work in the same rotational direction or sense externally of the counteracting range 30.

Figure 3:
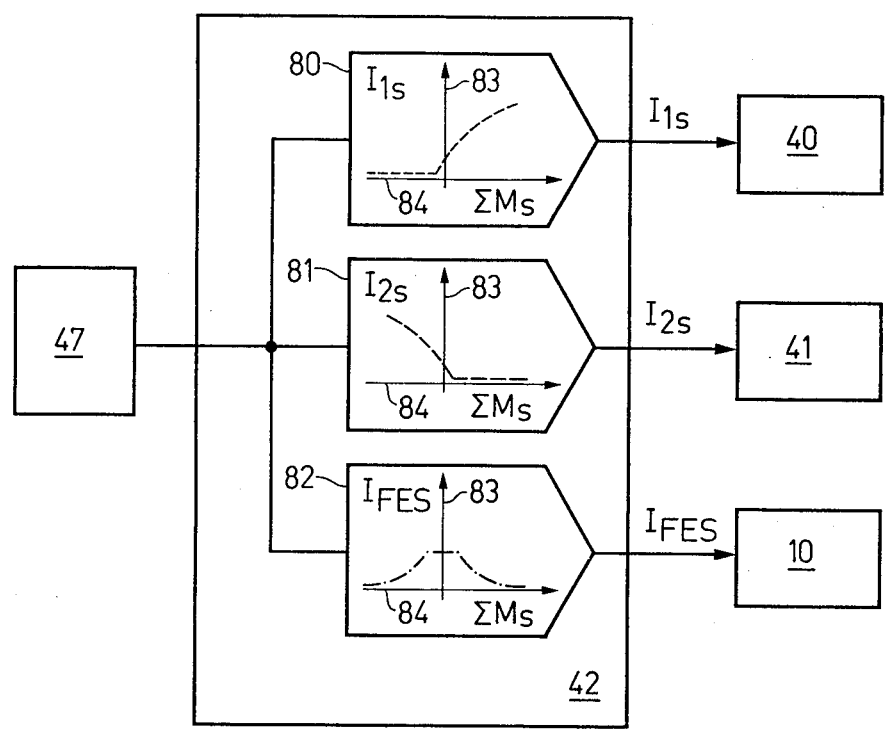
FIG. 3 is a block circuit diagram of the drive regulation system.

FIG. 3 illustrates in block circuit diagram the position and/or velocity regulator 47 as well as the electronic control 42 and in a first graph 80 the characteristic for $I_{1s}$, is a second graph 81 the characteristic for $I_{2s}$, and in a third graph 82 the characteristic for $I_{FES}$. In all three graphs there have been illustrated in each case along the ordinate 83 the set or reference current and along the abscissa 84 the summation drive torque set values $\Sigma M_s$ which, in each case, are predetermined by the position and/or velocity regulator 47. As the block circuit diagram shows $I_{1s}$ is inputted to the current regulator 40, $I_{2s}$ is inputted to the current regulator 41, and $I_{FES}$ is inputted to the FE-adjustment device 10 i.e. the 2-quadrant adjustment or setting device.

While there are shown and described present preferred embodiments of the invention, it is to be distinctly understood that the invention is not limited thereto, but may be otherwise variously embodied and practiced within the scope of the following claims.

What we claim is:

1. A high-precision drive decive comprising:
   two drive motors;
   a respective gearing means for operatively connecting each drive motor with a load movable in both directions of rotation about an axis;
   control means to operate said drive motors at least partially in opposition to one another with small summation drive torques for eliminating gearing backlash and to operate said drive motors in the same direction in the presence of large summation drive torques;
   each of said drive motors comprising a compound motor;
   each of said compound motors having an armature and a shunt winding;
   said armatures being connected in series and said shunt windings being connected in series; and
   said control means comprising:
   two output adjustment elements for controlling series excitation currents of said drive motors;
   each one of said two output adjustment elements being operatively connected to said drive motors to apply torque to said drive motors only in one predetermined direction; and
   an adjustment element of small output for controlling an external excitation current of said drive motors.

* * * * *